United States Patent

Cooper

[15] 3,687,510
[45] Aug. 29, 1972

[54] PIVOTED PAD JOURNAL BEARING
[72] Inventor: Glenn D. Cooper, Irwin, Pa.
[73] Assignee: Westinghouse Electric Corporation, Pittsburgh, Pa.
[22] Filed: Nov. 12, 1970
[21] Appl. No.: 88,606

[52] U.S. Cl.................................................308/122
[51] Int. Cl..............................................F16c 17/03
[58] Field of Search..............................308/73, 160

[56] References Cited

UNITED STATES PATENTS

| 1,336,373 | 4/1920 | Newbigin.....................308/73 |
| 2,363,260 | 11/1944 | Peskin..........................308/73 |
| 2,955,083 | 10/1960 | Sheppard....................308/160 |

FOREIGN PATENTS OR APPLICATIONS

245,968   8/1960   Australia.....................308/73

Primary Examiner—Martin P. Schwadron
Assistant Examiner—Frank Susko
Attorney—A. T. Stratton, F. P. Lyle and Gordon H. Telfer

[57] ABSTRACT

A journal bearing for severe loads is provided with pivoted load pads in the lower half and a viscosity pump in the upper half to provide a cooling fluid. The upper half may have a fixed sleeve type surface or may also comprise pivoted pads. The design provides dynamic stability and also overcomes temperature limitations of previous pad bearing designs.

5 Claims, 2 Drawing Figures

PATENTED AUG 29 1972　　　　　　　　　　　　3,687,510

PIVOTED PAD JOURNAL BEARING

BACKGROUND OF THE INVENTION

1. Field of the Invention

The invention relates to pivoted pad journal bearings, particularly those for applications with high speeds and large loads such as are encountered in large turbine generator rotors.

2. Description of the Prior Art

Large steam turbine and generator rotors have customarily operated in partial sleeve journal bearings. Such bearings have been satisfactory but the trend is now toward larger machine sizes. It has been found that on machines with a journal diameter of at least 17 inches a form of instability or self-excited vibration occurs. This condition, known as oil film whirl, creates a serious vibration problem for the machine. Pivoted pad bearings have been recognized to be free of oil film whirl.

Conventional pad type journal bearings have operating experience indicating that bearings for large journal sizes and high speed loads now required for machines such as turbine generators could not be built to operate within reasonable temperature limits on the bearing surface. The conventional pad type bearing consists of a plurality of babbitted steel pads, generally four, equally spaced around the shaft, with each pad supported on a crowned single point pivot at its center. Oil is fed from an external pressure source into each of the spaces between pads and exits between the shaft and annular seal rings at each end of the bearing.

There are several reasons why conventional pad type bearings operate too hot at high speeds and loads. The high oil film shear rates create high heat losses at the pad surface and a resultant thermal gradient through the pad thickness. This gradient causes a bending deflection of the pad which adds to deflections caused by loading about the pivot point, resulting in thinner oil films and even higher temperatures in the central portion of the pads. Another factor is that the external oil supply system is usually set to provide a feed pressure of 15 pounds per square inch which provides insufficient flow to keep the mean temperature of the oil available at the pad at desired levels. The type of bearings that have pads pivoted around the upper as well as lower portions of the bearings incur higher losses than equivalent sleeve bearings because the upper portion of the pad type bearing is loaded as well as the lower pads while in sleeve bearings the upper half is relieved.

It has been recognized that the temperature limits of pad type bearings, particularly thrust bearings, can be increased by forcing a coolant through the pads near enough to the pad's surface to provide thermal conduction. Yet there has not previously been provided a pivoted pad journal bearing structure capable of performance on large size journals (e.g. 17 inches diameter or more) and high speeds (e.g. 3,600 rpm or more).

Representative prior art with regard to forced cooled thrust bearings includes Sheppard U.S. Pat. No. 2,955,003, Oct. 4, 1960. An example of prior art disclosing a pivoted pad journal bearing with oil flow channels to the bearing surfaces for lubrication from a self contained supply is Swedish Pat. No. 89,546, published June 22, 1937. The latter patent also discloses a journal bearing having both pivoted pad and fixed sleeve type portions. Tichvinsky et al. 2,315,674, Apr. 6, 1943, is an example of prior art directed to sleeve type bearings for loads and speeds considered large and high, respectively, at the time that invention was made.

SUMMARY OF THE INVENTION

In accordance with this invention a journal bearing is provided with a plurality of pivoted bearing pads within a shell and includes pads in the lower half of the shell that each comprise a main support portion of a material such as steel and a portion near the bearing surface of a material such as copper with means to circulate a coolant through interior channels in the pad which bring the coolant into contact with the second portion for improved cooling of the bearing surface.

The coolant is provided by a pressurized supply external to the bearing structure. An inlet port to the interior of the shell is located in the upper half of the bearing with the bearing surface adjacent to the inlet port configured to provide a viscosity pump action upon rotation of a shaft therein. The coolant is preferably the lubricant (e.g. oil) that also flows to form a film on the bearing surfaces.

The upper portion of the shell can be provided with pivoted bearing pads, which need not be forced cooled. Alternatively, the upper half is provided with a sleeve type bearing portion which has, in combination with the cooled pivot bearings of the lower half, reduced losses compared with a bearing of all sleeve type or all pad type portions.

The viscosity pump incorporated in the top half of the bearing may be provided in a groove having a tapered surface or having a fixed dimensional offset from the circular surface defined by the bearing surfaces of the lower pads.

Bearings in accordance with this invention have been found particularly advantageous for large machines such as turbine generators where journal sizes are in excess of 16 inches and speeds reach up to 3,600 rpm or more with loads of at least 50,000 pounds. The invention has been applied to turbine generators with 21 inch journal capacities and 3,600 rpm speed. It is expected that such designs will be extended to larger sizes as will become necessary for turbine-generator sets rated 1,000 MVA and up.

THE DRAWING

FIG. 1 is a transverse sectional view of one embodiment of the present invention; and FIG. 2 is a transverse sectional view of an alternate embodiment of the present invention.

DESCRIPTION OF THE PREFERRED EMBODIMENT

Figure 1:
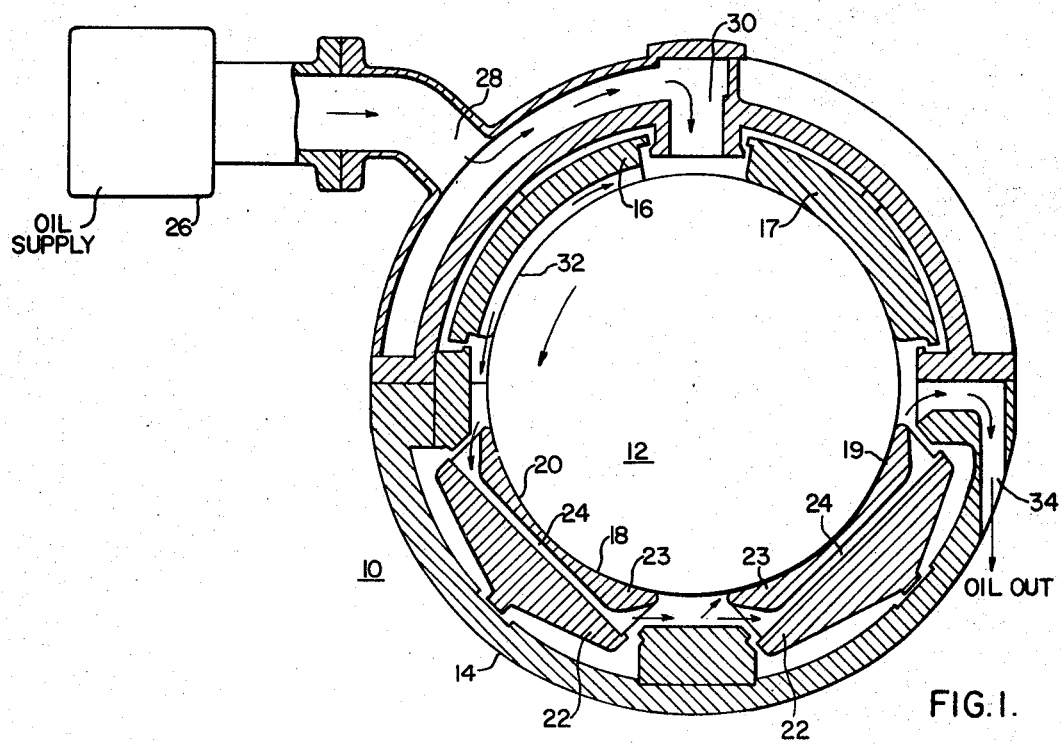

Referring to FIG. 1 there is shown a bearing 10 of the pivoted pad type for permitting rotation of a shaft 12 therein. The bearing structure comprises a metal shell 14 of a generally cylindrical configuration. A plurality of pivoted bearing pads 16, 17, 18 and 19, each of which has a bearing surface (such as surface 20 of pad 18), face towards the center of the shell and support and permit rotation of shaft 12. The bearing surfaces are usually provided with a layer of babbit material. In this embodiment, the bearing 10 is provided with four pivoted pads of which two are disposed in the upper half of the shell and two in the lower half. While the number of pivoted pads and apparatus in accordance with this invention may be varied, there are at least two pads in the lower half of the shell.

Each of the pads 18 and 19 in the lower half comprises a first portion 22 adjacent to the shell and a second portion 23 adjacent to the bearing surface and supported on the first portion 22. The second portion has a higher thermal conductivity than the first portion such as can be provided by making the second portion of copper while the first portion is of steel. Interior channels 24 are provided in the lower pads. The channels 24 have at least one wall provided by the second bearing pad portion 23, that is, the high conductivity or copper portion. For example, the lower surface of the copper portion 23 may be grooved, with such grooves and the top of steel pad portion 22 defining the channels 24.

A fluid serving as a coolant and lubricant is circulated through the bearing. This fluid, generally an oil, is provided from a supply 26, under pressure, through an inlet port 28 into the upper half of the shell 14 and through port 30 into the interior. In a four pad bearing as shown, the port 30 to the interior of the bearing is conveniently between the upper two pads 16 and 17. The arrows indicate the oil flow path as is determined by the structure of the bearing and by the direction of rotation of the shaft 12. The pad 16, in the direction of rotation from the port 30, is shaped to provide a viscosity pump. Oil entering the interior space is carried by the shaft through an interior groove 32 in pad 16. The oil is carried down to the lower half of the bearing where it will flow through the channels 24 in the lower pads 18 and 19. The oil also supplies a thin lubricating film on the bearing surfaces. In fact the entire interior volume of the bearing is filled with oil in the operation of this apparatus but there is required a definite flow between inlet port 28 and an outlet port 34 rather than merely recirculating the oil internally. Any such recirculating system with a wholly contained oil system would be inadequate for cooling of high speed and large size bearings to which the present invention is applicable. The oil exiting from port 34 is cooled substantially before any possible reuse in the bearing.

The slot or groove 32 in the upper bearing pad 16 through which oil flows down into the lower part of the bearing functions as a viscosity pump that increases the pressure of the incoming oil, above that of the supply 26, to force it through cooling channels 24 of the lower pads 18 and 19. The slot 32 may have a uniform dimension from the shaft surface or it may be tapered with a gradually increasing distance between the shaft and the bottom of the groove 32 progressing from the port 30 in the direction of shaft rotation. The other upper pad 17 has a bearing surface that is uniform against the shaft 12 so that there is not a direct flow path for the oil to return to the upper half of the bearing in any significant volume and thus it exits through the outlet port 34 after having made a 270° circuit of the bearing. Oil flowing through the lower pads reduces the temperature of the pad surfaces which are bearing most of the load and also reduces the thermal gradient across the pad.

The pivoted pads may each be on a point pivot or on a line pivot that extends from one end of the bearing to the other in the axial direction for the greatest support and stability. Also, the pivot point or line is offset from the center by a few degrees in the direction of rotation of the shaft for improved stability.

The combination of features in accordance with this invention has been found to be particularly important in solving the problems associated with fast, large bearings, particularly those having a shaft dimension of at least 17 inches, a maximum speed of rotation of at least 3,600 rpm, and a load of at least 50,000 pounds.

By way of further example, a bearing as in FIG. 1 was made with an internal diameter of 19 inches and a pad length of 16 inches. The viscosity pump slot 32 in one of the upper pads was 0.3 inch deep and 6 inches wide. The nominal radial clearance between the shaft and bearing surfaces was 0.019 inch. The oil viscoisty in the bearing was 150 SSU at 100° F. The oil supply pressure was 15 psi. Thermocouples were embedded in the babbitted copper shoes 23 of the lower pads. Under a load of 65,000 pounds (providing a nominal pressure of 214 pounds per square inch) various tests were made at shaft speeds up to 3,600 rpm. It was found that surface temperatures of the bottom pads were well within practical limits, under 80° C. even for highest speeds and well below temperatures reported for some conventional pad bearings of smaller size and load. The top pads ran considerably hotter than the bottom ones at high speeds even though they carry much less load. This difference indicates the combined effectiveness of the copper pad with its high thermal conductivity and cooling grooves and also the offset pivots in the bottom pads. (In the example tested the upper pads had pivots on their centerlines). Mechanical stability was found satisfactory even at 3,600 rpm.

Figure 2:
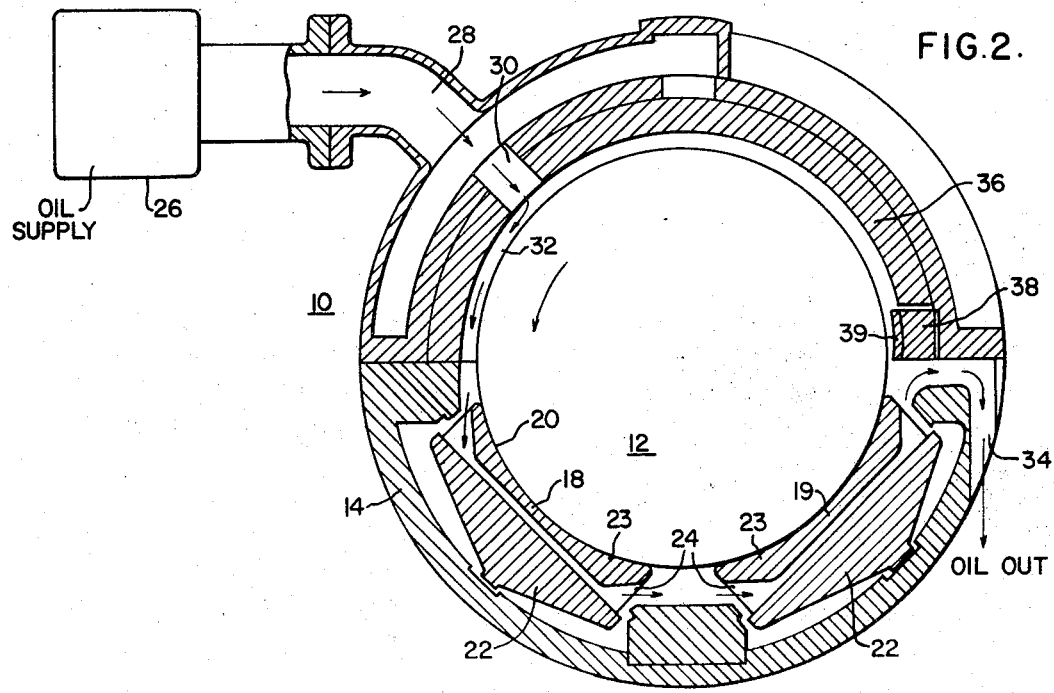

FIG. 2 shows an alternate form of the invention which has some features in common with that of FIG. 1 including the bottom pads 18 and 19 having channels 24 between portions 22 and 23 of different thermal conductivity for superior cooling by flow of coolant through the channels. Like elements of FIGS. 1 and 2 are identified by the same reference numerals. In the embodiment of FIG. 2 the upper half of the bearing is a relieved fixed sleeve portion 36 which has a slot 32 for the oil flow. It has been found that such an embodiment provides reduced losses as compared with that of FIG. 1. In FIG. 2 the oil enters through port 30 at a point in the upper half at about 45° from the horizontal line and flows down through groove 32, channels 24 of the lower pads, and out through port 34. A dam 38 is provided just above the location of the exit port 34 to minimize recirculation of oil within the bearing. The dam extends inward from the shell 14 to provide a surface 39 (preferably babbitted) closely spaced (e.g. about 0.020 inch) to wipe off oil from the shaft.

Among embodiments of the invention that have been made are bearings of 21 inches diameter and 18 inches long in versions like FIG. 1 and also FIG. 2. Tests were made at speeds in a range up to 3,600 rpm. While both versions exhibited adequate thermal characteristics and mechanical stability, the type shown in FIG. 2 had lower operating temperatures (e.g., about 10° C. lower surface temperatures on the bottom pads) and lower operating losses (about 15 percent lower at 3,600 rpm).

In the embodiments of FIGS. 1 and 2 various details of good bearing design in accordance with present practice have not been illustrated. For example, end seals to minimize oil losses along the shaft are of course necessary and should be chosen to be as effective as possible without incurring intolerable losses.

I claim as my invention:

1. A journal bearing comprising:
a shell; a plurality of pivoted bearing pads supported within said shell and each having a bearing surface facing the center of said shell, said plurality of pads including at least two lower pads located in the lower half of said shell, said lower pads each comprising a first portion adjacent said shell and a second portion adjacent said bearing surface and supported on said first portion, said second portion having higher thermal conductivity than said first portion; and means to circulate a coolant from an external supply through interior channels in said lower pads which bring said coolant into contact with said second portions thereof; said means to circulate a coolant comprising a coolant supply channel within said shell and an inlet port to the interior of said shell located in the upper half of said shell and an adjacent bearing surface is set back with respect to the location of said lower pad bearing surface to permit coolant flow to said lower pads.

2. The subject matter of claim 1 wherein: said coolant is a lubricant that also flows from said inlet port to form a film on said bearing surfaces.

3. The subject matter of claim 1 wherein: said plurality of pivoted bearing pads also includes at least two upper pads located in the upper half of said shell consisting essentially of a single portion of steel; and said first portion of said lower pads consists essentially of steel and said second portions of said lower pads consists essentially of copper.

4. The subject matter of claim 1 wherein: the upper half of said shell has on its interior a fixed sleeve bearing portion.

5. Rotation apparatus comprising: a shaft, a journal bearing supporting and permitting rotation of said shaft; said shaft producing a total load on said bearing in excess of 50,000 pounds; said shaft having a diameter of at least 17 inches and a maximum speed of rotation of at least 3,600 rpm; said bearing characterized by having a plurality of pivoted pads in its lower half with surface portions of higher thermal conductivity than lower support portions thereof and channels between said portions substantially parallel to the bearing surfaces and an upper half of a fixed sleeve portion relieved from any substantial contact with said shaft and having a grove for coolant flow from an inlet port in said upper half of said channels in said pivoted pads and out through a discharge port; and means for the forced circulation of a coolant fluid through said channels from a supply external to the bearing without direct recirculation.

* * * * *